US006757419B1

(12) United States Patent
Ross et al.

(10) Patent No.: US 6,757,419 B1
(45) Date of Patent: Jun. 29, 2004

(54) IMAGING SYSTEM

(75) Inventors: Gary A. Ross, Fife (GB); Brian E. Storey, Dundee (GB)

(73) Assignee: NCR Corporation, Dayton, OH (US)

( * ) Notice: Subject to any disclaimer, the term of this patent is extended or adjusted under 35 U.S.C. 154(b) by 540 days.

(21) Appl. No.: 09/651,978

(22) Filed: Nov. 13, 2000

(30) Foreign Application Priority Data

Sep. 1, 1999 (GB) ............................................ 9920501

(51) Int. Cl.[7] ................................................ G06K 9/00
(52) U.S. Cl. .................................................... 382/137
(58) Field of Search ................................ 382/138, 139, 382/140, 112, 260, 210, 191, 137

(56) References Cited

U.S. PATENT DOCUMENTS

| | | | | | |
|---|---|---|---|---|---|
| 3,834,817 A | * | 9/1974 | Vinnemann et al. | 356/308 |
| 4,841,140 A | * | 6/1989 | Sullivan et al. | 250/226 |
| 4,922,337 A | | 5/1990 | Hunt et al. | 358/101 |
| 5,159,199 A | * | 10/1992 | LaBaw | 250/339.02 |
| 5,274,567 A | * | 12/1993 | Kallin et al. | 700/213 |
| 5,288,586 A | * | 2/1994 | Yamaguchi | 430/138 |
| 5,304,813 A | * | 4/1994 | De Man | 250/556 |
| 5,426,710 A | | 6/1995 | Suzuki et al. | 382/135 |
| 5,508,525 A | * | 4/1996 | Day et al. | 250/339.07 |
| 5,602,939 A | | 2/1997 | Hashiguchi et al. | 382/162 |
| 5,751,842 A | * | 5/1998 | Riach et al. | 382/137 |
| 5,754,674 A | * | 5/1998 | Ott et al. | 382/112 |
| 5,781,314 A | * | 7/1998 | Mochizuki | 358/509 |
| 5,790,188 A | | 8/1998 | Sun | 348/144 |
| 5,880,846 A | * | 3/1999 | Hasman et al. | 356/602 |
| 6,594,038 B1 | * | 7/2003 | Ikeda | 358/486 |

FOREIGN PATENT DOCUMENTS

| | | | |
|---|---|---|---|
| EP | 0605259 | | 7/1994 |
| EP | 0725375 | | 8/1996 |
| EP | 0 935 223 A1 | * | 8/1999 |
| WO | 9636021 | | 11/1996 |
| WO | 9845687 | | 10/1998 |

* cited by examiner

*Primary Examiner*—Daniel Mariam
*Assistant Examiner*—Shefali Patel
(74) *Attorney, Agent, or Firm*—Francis L. Conte

(57) ABSTRACT

A method of imaging media, such as banknotes, is provided. A note is moved with respect to a CCD camera and a variable interference filter (VIF), and a succession of images acquired over time. From the plurality of images covering a range of wavelengths of light, profiles may be assembled of the optical characteristics of the banknote. These may then be compared with reference profiles to detect forged, fake, or unacceptable media. The method may also be applied to a range of types of objects. Also provided is an apparatus for implementing the method.

27 Claims, 3 Drawing Sheets

IMAGING SYSTEM

BACKGROUND OF THE INVENTION

The present invention relates to an apparatus and method for acquiring and processing images, particularly of moving media, and for the validation of such media. The invention has particular application in the field of self-service terminals (SST) and in detection of forged banknotes and similar media. In its broader aspects the invention has application in verifying or confirming the source or validity of other items or products.

A growing number of financial and similar transactions are carried by means of self-service terminals (SSTs) such as automated teller machines (ATMs). Many transactions involve the deposit of media such as banknotes into the SST to pay for some service or product, or simply to credit the deposit to a user's bank account. Therefore such SSTs require a media recognition mechanism to recognize and determine the value of the deposited media, and to validate the media and detect forged or inappropriate media, such as forged banknotes or foreign currency.

A number of systems currently exist for the validation of banknotes based largely on the identification of specific anti-fraud features incorporated in the notes. Features which may be used by SSTs to verify banknotes include the detection of magnetic "bar codes" on the notes; watermarks; response of the notes to ultraviolet light; the size and shape of banknotes; interference patterns generated by light reflected from the banknotes; the electrical capacitance of the banknotes; and various other features. However, existing systems suffer from the disadvantages that particular anti-fraud features are found in certain denominations or currencies of banknotes but not in others, and thus a system designed to detect, say, Swiss Francs may not be able to validate US Dollars; and that a suite of different sensors is typically required to detect a range of characteristics of the banknotes in question. Thus, SSTs destined for different markets must be designed and configured individually, and modified if there is any change to the design of the local currency.

A further disadvantage is that existing validation systems typically require the banknote to be stationary, extending the time necessary to execute a transaction.

SUMMARY OF THE INVENTION

It is among the objects of embodiments of the present invention to obviate or alleviate these and other disadvantages of existing media validation systems. This may be achieved, in part, by making use of the optical properties of banknotes, in particular the complex colors of the inks used in printing banknotes: a feature which is almost universal among banknotes is the high quality of ink used. Colors of banknotes are typically produced by a 'pure' color ink, rather than a blend of different colors such as red, yellow, and blue. Embodiments of the present invention enable these 'pure' colors to be detected on banknotes, or indeed any other media. A similar principle may also be utilized in verifying the source of a particular product of almost any form, by analysis of particular optical properties of the product, as described below.

According to a first aspect of the present invention there is provided a method of imaging media, the method comprising the steps of:

a) locating media in the path of an imaging means and a variable interference filter (VIF), the filter being disposed between the media and the imaging means;

b) acquiring an image of at least a region of the media;

c) processing the image to determine a selected characteristic of the media;

d) moving the media relative to at least one of the filter and imaging means;

e) acquiring a further image of at least a region of the media; and f) processing the further image to determine a selected characteristic of the media.

The image thereby consists of data relating to the intensity of the particular wavelength of light passed by the filter. In the case of banknotes, the intensity of each wavelength band will vary depending on the presence or absence of ink of a particular color or composition; which factor will in turn aid in determination of the denomination, currency, and acceptability of the banknote. Although reference is made herein primarily to the handling of banknotes, those of skill in the art will realize the invention has applicability in relation to other forms of valuable media, and indeed to any product which is colored or possesses particular light reflecting qualities.

Processing of the images may take place in sequence, that is, each image is processed prior to acquisition of a further image; or, preferably, all images are processed subsequent to the end of the acquisition steps.

Preferably, the imaging means comprises a monochrome CCD camera. This acquires the image in a digital format which is relatively easy to process and manipulate. Use of a monochrome camera ensures that no color filtering of the image occurs other than that provided by use of the filter; color CCD cameras typically detect images by detecting the intensity separately of red, green, and blue wavelengths of light. However, alternative imaging means may be used, for example other forms of camera or light intensity sensors; the acquired image is not necessarily human readable or recognizable, and may take the form of a digital data stream.

Preferably, the VIF is a linear VIF. A linear VIF is a narrow bandpass filter which passes light according to a wavelength that varies linearly along the length of the filter but is constant across its width. A typical linear VIF may pass light which varies from 400 nm to 700 nm along the length of the filter to cover the visible spectrum; or from 400 nm to 1000 nm to include infra-red. Of course, any desired range of wavelengths may be utilized.

The above-described method using a VIF is capable of acquiring image information over the whole area of a banknote over the whole visual spectrum (if desired) with a high spatial resolution, while the banknote is moving. That is, as a region of the banknote moves with respect to the filter and the imaging means, a sequence of images will be acquired; and each image will contain information relating to the intensity of light of a different part of the spectrum: if desired the entire note may be imaged across the whole spectrum passed by the VIF.

Preferably, the step of processing the acquired images may be used to assemble selected types of spectrum information which may be used for identification of banknotes, or simply to isolate information of interest for a particular purpose from the full amount of acquired data. For example, the presence or absence of a particular ink color may be determined from the image of the note acquired at a specific wavelength. As each image acquired by means of a VIF as described above includes data from a number of wavelengths, to obtain an image of the whole note at a single wavelength, it is necessary to manipulate the acquired images. Further, the whole range of acquired data may not be required for some applications; unwanted data may be discarded in processing to increase the speed of the remaining operations.

Preferably also, the method further includes the step of comparing some part of the acquired data against reference data. This enables an identification of the banknotes to be carried out, and if the note is not recognized, to be rejected. For example, processed images of a single wavelength may be compared against a reference image of a banknote at the same wavelength. Alternatively, or in addition, the full spectrum information of a note over a selected area of the note, such as the name of the issuing bank, or the denomination of the note, may be compared against a reference portion of a genuine note.

Conveniently, a number of features of the method may be varied. The rate of acquisition of images and the speed of movement of the media relative to the filter or imaging means may both be varied independently to alter the spatial and spectral resolution of the acquired images, depending on the desired purpose of the imaging. Also the processing step and comparison steps may be varied to adapt the method for use with different banknotes or different types of media, each type having its own diagnostic characteristics. Most conveniently, these steps are implemented by computer programs, thus making these modifications relatively straightforward to effect.

According to a second aspect of the present invention there is provided a method of detecting forged media, the method comprising the steps of:

a) locating media in the path of an imaging means and an optical filter, the filter being disposed between the media and the imaging means;

b) acquiring an image of at least a region of the media;

c) processing the image to determine a selected characteristic of the media; and d) comparing the acquired image against a reference image derived from genuine media.

Forged media, such as banknotes, do not reproduce precisely the spectral and spatial distribution of color over the banknote, due to the use of different inks and printing presses, and so may be detected in this way. Other products, for example "designer" clothing or pharmaceutical products will feature particular dyes, and so genuine products may be distinguished in this way from fake products.

According to a third aspect of the present invention there is provided an apparatus for imaging media, the apparatus comprising:

imaging means for acquiring an image of an object;

a variable interference filter for passing light only of specific wavelengths from an object to the imaging means; and image processing means for processing the acquired images and extracting selected data therefrom.

Preferably, the apparatus further comprises media transport means for moving the object relative to the filter means and the imaging means. This enables the full available range of spectral and spatial data to be acquired; for example, images of an entire banknote may be acquired over a 400 nm–700 nm range.

Preferably, the imaging means comprises a CCD camera. Preferably also, the filter means comprises a linear variable interference filter (VIF). Preferably also, the image processing means comprises a computer provided with appropriate computer programs.

According to a fourth aspect of the present invention there is provided a self-service terminal (SST) comprising:

media input means for transporting media, such as banknotes or the like, into the SST;

imaging means for acquiring an image of the media;

filter means for passing light only of specific wavelengths from the media to the imaging means; and image processing means for processing the acquired images and extracting selected data therefrom.

According to a fifth aspect of the present invention there is provided a method of operating a self-service terminal (SST), the method comprising the steps of:

depositing media into the SST;

locating the media in the path of an imaging means and an optical filter, the filter being disposed between the media and the imaging means;

acquiring an image of at least a region of the media;

processing the image to determine a selected characteristic of the media;

comparing said selected characteristic of the entered media against a reference characteristic of acceptable media; and rejecting or accepting the deposited media accordingly.

According to a sixth aspect of the present invention, there is provided a method of characterizing objects according to specific optical properties, the method comprising the steps of:

locating the object in the path of an imaging means and an optical filter, the filter being disposed between the object and the imaging means;

acquiring an image of at least a region of the object;

processing the image to determine a selected characteristic of the object;

comparing said selected characteristic of the imaged object against a reference characteristic of standard objects; and characterizing the imaged object accordingly.

BRIEF DESCRIPTION OF THE DRAWINGS

These and other aspects of the present invention will now be described by way of example only with reference to the accompanying figures in which.

DETAIL DESCRIPTION

Figure 1:
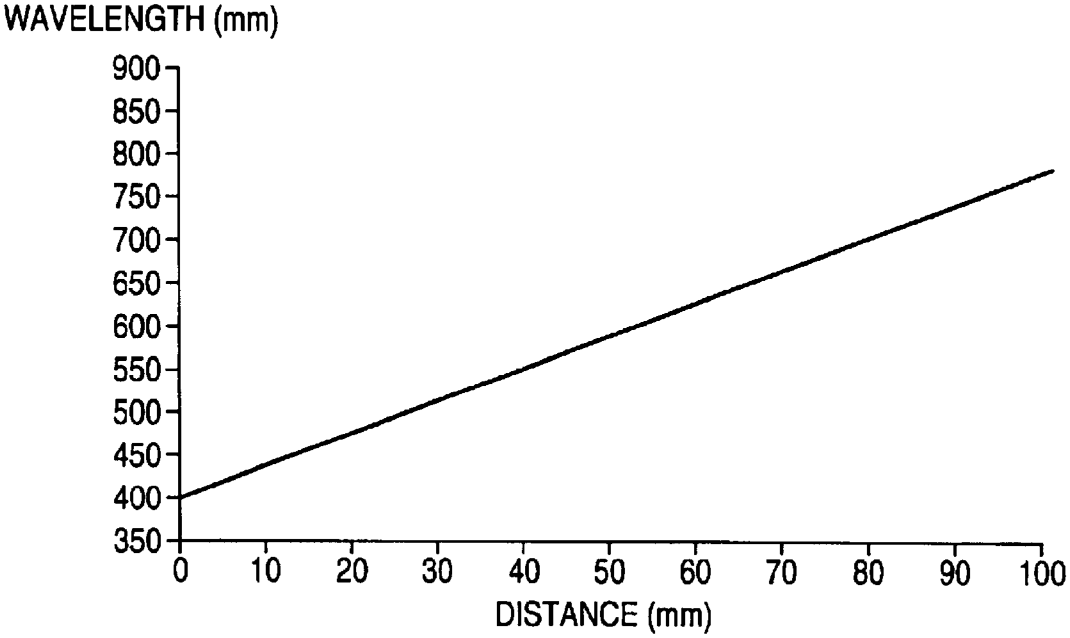
FIG. 1 shows the wavelength against distance characteristics for an exemplary linear variable interference filter (VIF)

Referring first of all to FIG. 1, this shows a graph of admitted wavelengths of light against position along the length of an example VIF which may be used in an embodiment of the present invention. It is apparent that the admitted wavelength changes linearly across the length of the VIF; across the width of the filter the wavelength is constant. Examples of VIFs suitable for use in the present invention include the VERIL S60 (visible light) and VERIL BL 200 (color and infra-red), both manufactured by Schott.

Figure 4:
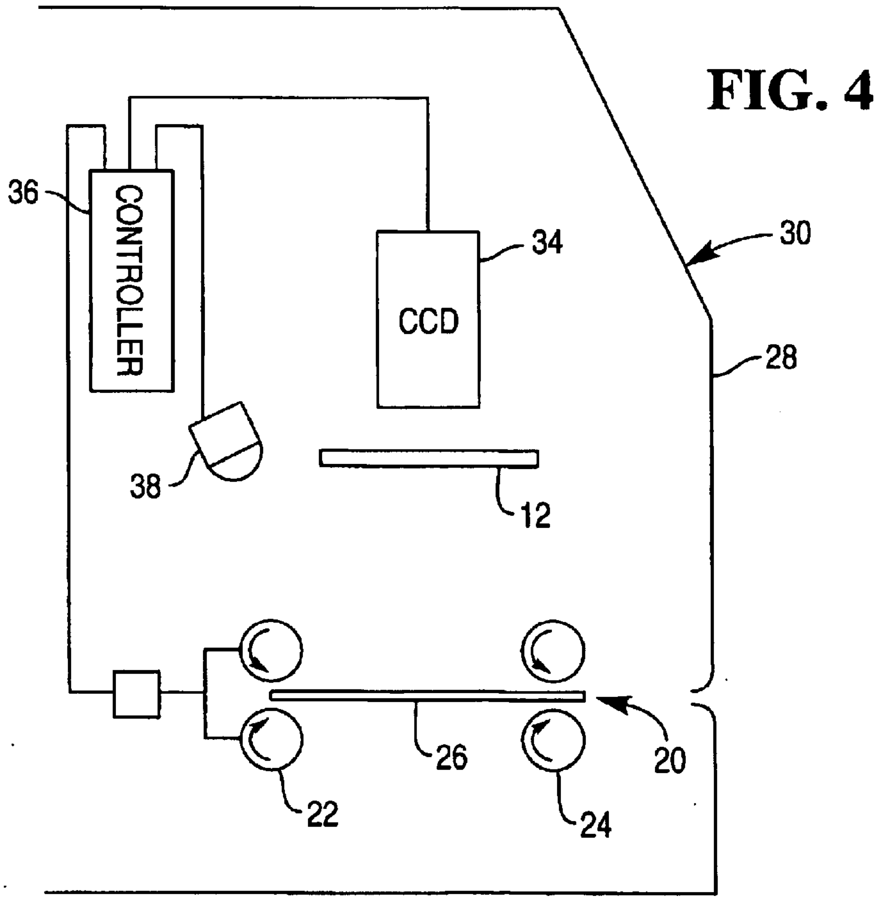
FIG. 4 shows an apparatus for imaging media according to an embodiment of a further aspect of the present invention.

FIG. 4 shows a sketch of an apparatus in the form of part of an SST for imaging media in accordance with an embodiment of an aspect of the present invention. The apparatus 30 comprises a VIF 12 in conjunction with a CCD camera 34, connected to a processor\controller 36. A light source 38 illuminates a media transport arrangement 20, which comprises two pairs of rollers 22, 24 and a transport plate 26. The processor\controller, as well as processing data collected by the VIF 12 and CCD camera 34, controls the speed of the media transport 20, to adjust the apparatus 30 for use in different conditions. The various parts of the apparatus are located in a self-service terminal (SST), behind an SST fascia 28. The apparatus may of course be modified for use in other locations.

Figure 2:
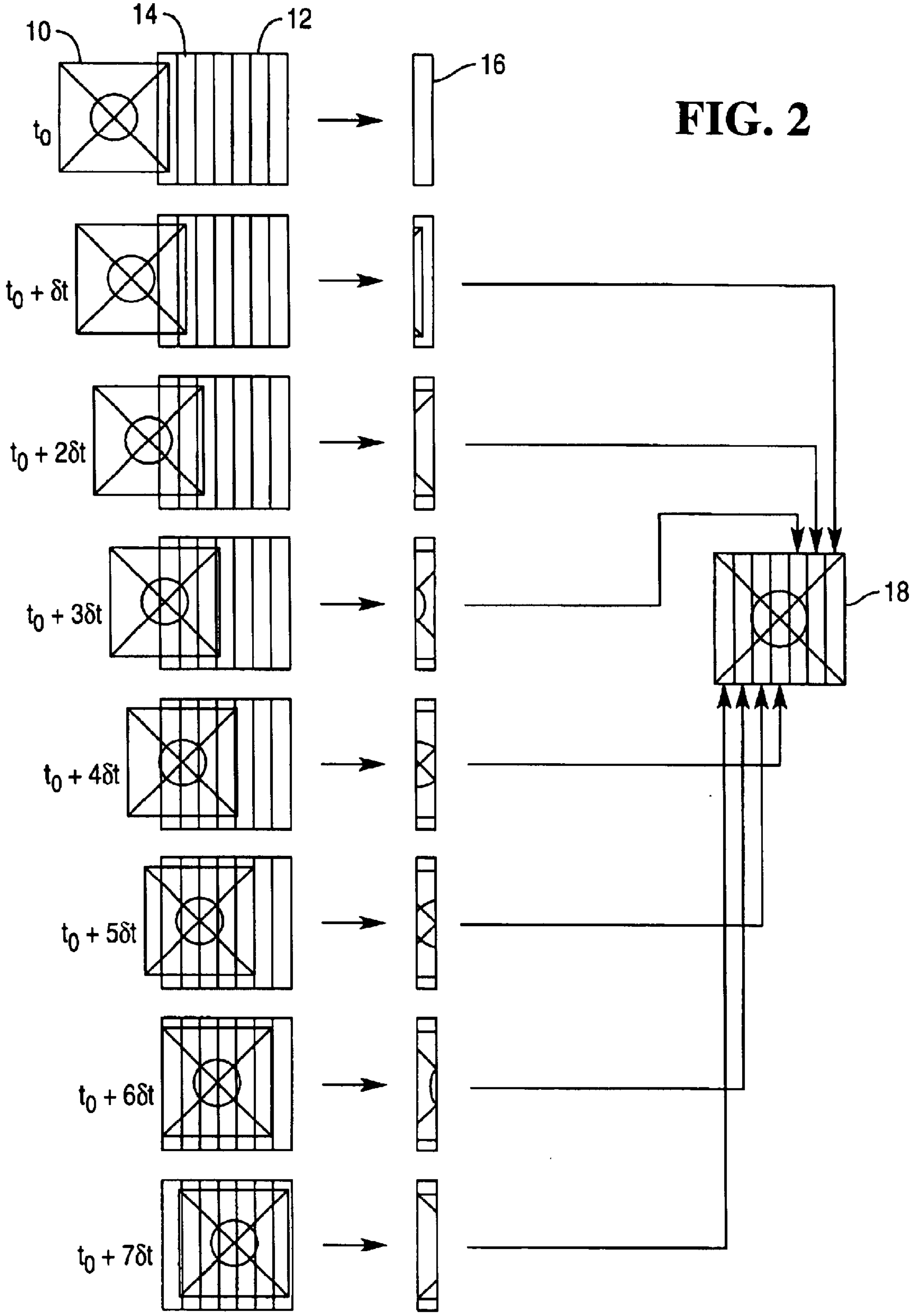
FIG. 2 shows a schematic example of data capture according to an embodiment of one aspect of the present invention.

FIG. 2 is a schematic illustration of the application of the method of the present invention in acquiring an image of a banknote which is moving relative to a CCD camera and a VIF. During capture of a single frame by a CCD camera in conjunction with a VIF, a given line in the image gives the intensity of light from the banknote in the narrow spectral bandwidth of the VIF at that position. The image itself comprises many such lines across the banknote, each being characteristic of light passed at a different wavelength.

This VIF bandwidth will typically vary from 400 nm to 750 nm across the whole image. Since the banknote is moving with respect to the VIF\CCD, the image acquired by the CCD will be displaced from one frame to the next. Thus, the image of a particular line or region across the width of the banknote will move between frames, and the intensity information for each sequential image of the line across the note will be for a different spectral wavelength. During a sequence of frames, the banknote will move across the entire VIF, and so will generate information regarding the full spectrum of every pixel in the image of the banknote.

FIG. 2 illustrates this process. Shown at time to in this figure is a banknote 10 about to pass before a VIF 12 in conjunction with a CCD (not shown). The schematic VIF 12 shown here is divided into seven 50 nm range bands for simplicity, covering the range 400 nm to 750 nm. In this example, only a single band 14 of interest is enumerated, for simplicity, the band 14 covering 450 nm to 500 nm. In many actual applications a number of bands 14 will be acquired, covering the whole wavelength range of the filter. The system is triggered when the edge of the note 10 enters the imaging system, and the first image collected at time to. The entire image over the VIF is collected, while dedicated software processes this data to give only the image information for the desired band 14, which information is then stored in memory 16.

The note 10 is continuously moving during this process, and at time to $t_0$+t a second image is acquired. Again, the data from the band of interest is gathered and stored. This process is continued until the note 10 has left the imaging area. Each of the band images stored in the memory 16 may then be processed and integrated to provide a complete image 18 of the entire banknote at the selected wavelength.

The process described may be modified to acquire different types of information. In theory, the number of frames and wavelength range may be made arbitrarily small, depending on the physical constraints of imaging technology and VIF manufacture. The selected range of data may be altered to detect different characteristics of banknotes. Data for two or more wavelength bands may be collected simultaneously; or all the images taken over the whole VIF range may be stored, and post processing used to generate any desired data set.

Figure 3A:
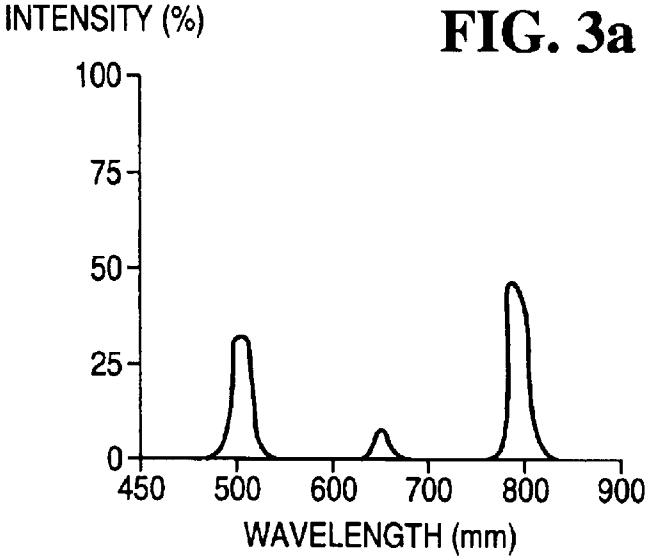
FIGS. 3*a* and 3*b* show examples of spectral data which may be obtained according to an embodiment of one aspect of the present invention.
Figure 3B:
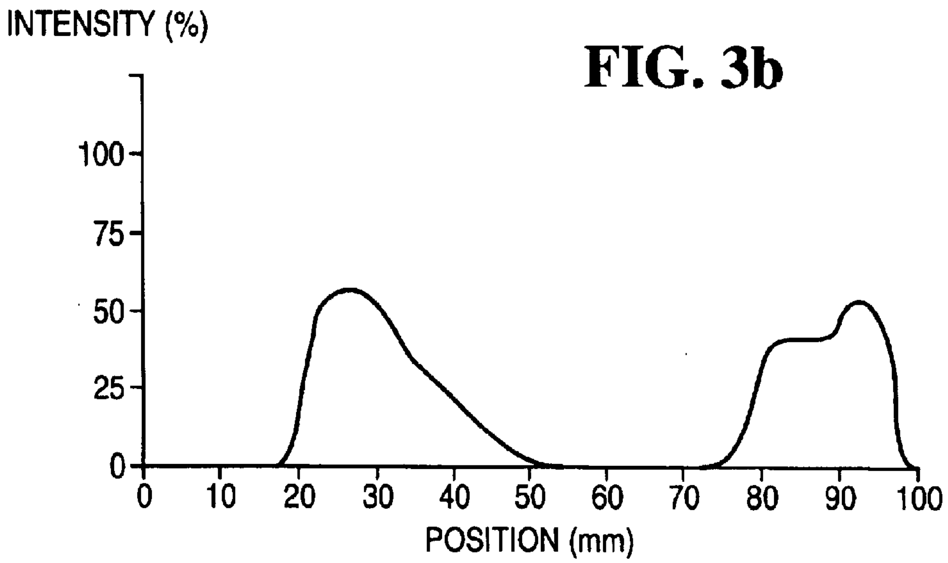

Hypothetical examples of the type of data obtained are shown in FIGS. 3*a* and 3*b*. FIG. 3*a* shows an example of intensity against wavelength for a particular line on a banknote: this line reflects light strongly at 500 and 800 nm, and more weakly at 650 nm. Such a spectral profile would be characteristic of a particular type of banknote. Similarly, FIG. 3*b* shows intensity against position information for a particular wavelength of light: this would be the data obtained from the example of FIG. 2. Again, this profile would be characteristic for a particular type of banknote.

For example, a typical genuine banknote may include ink of a particular green color. On a banknote, this would be formed from a single pure green ink, and so the profile would have a single peak at the wavelength of green light. A forged note, however, may use a mixture of blue and yellow inks to provide a color which looks indistinguishable to the human eye, but when analyzed yields a profile with two peaks, one each at the blue and yellow wavelengths.

It will be seen from the foregoing that the present invention provides a method and apparatus whereby media may be verified according to their optical characteristics. For use with banknotes, the invention may be used alone or in conjunction with other known techniques: for example, known optical character recognition (OCR) techniques may be used to identify the issuing bank and the serial number of a banknote; then the present invention may be used to analyze the spectral composition of the printed serial number, and compare this against stored data representing the expected spectra for a range of genuine banknotes.

The present invention has a number of advantages over other systems: media may be analyzed whilst in motion; a wide range of characteristics may be analyzed; and the system is straightforwardly reconfigurable to adapt for different uses. The present invention is also not limited to use with banknotes, but may be used for validation of any suitable media with regular distinguishable spectral characteristics: for example, foodstuffs, labels, cloth, checks, official documents, and the like.

What is claimed is:

1. A method of imaging media, the method comprising the steps of:

(a) locating media in the path of an imaging device and a variable interference filter (VIF), the filter being disposed between the media and the imaging device;

(b) acquiring an of at least a region of the media;

(c) processing th image to determine a selected characteristic of the media including spectral and spatial distribution of color thereover;

(d) moving the media relative to at least one of the filter and the imaging device;

(e) acquiring a further image of at least a region of the media;

(f) processing the further image to determine a selected characteristic of the media including spectral and spatial distribution of color thereover; and (g) generating a spectral image of said media, and comparing said spectral image with a reference image of a corresponding genuine media, and wherein said media is a banknote.

2. A method according to claim 1, wherein all images are acquired prior to the processing of the images.

3. A method according to claim 1, wherein the imaging device comprises a charge coupled device (CCD) camera.

4. A method according to claim 1, wherein the VIF comprises a linear VIF.

5. A method according to claim 1, wherein step (c) includes the step of:

(c-1)assembling selected types of spectrum information which may be used for identification of banknotes.

6. A method according to claim 1, wherein step (f) includes the step of:

(f-1)assembling selected types of spectrum information which may be used for identification of banknotes.

7. A method according to claim 1, wherein the image device comprises a monochrome charge coupled device (CCD) camera.

8. A method of processing media, the method comprising the steps of:

(a) locating media in the path of an imaging device and a variable interference filter (VIF) which is disposed between the media and the imaging device;

(b) acquiring a first image of at least a region of the media;

(c) processing the first image to determine a selected characteristic of the media including spectral and spatial distribution of color thereover;

(d) moving the media relative to at least one of the filter and the imaging device;

(e) acquiring a second image of at least a region of the media after the media has moved in step (d);

(f) processing the second image to determine a selected characteristic of the media including spectral and spatial distribution of color thereover; and (g) generating a spectral image of said media, and comparing said spectral image with a reference image of a corresponding genuine media, and wherein said media is a banknote.

9. A method according to claim 8, wherein all images are acquired prior to the processing of the images.

10. A method according to claim 8, wherein the imaging device comprises a charge coupled device (CCD) camera.

11. A method according to claim 8, wherein the VIF comprises a linear VIF.

12. A method according to claim 8, wherein step (c) includes the step of:

(c-1)assembling selected types of spectrum information which may be used for identification of banknotes.

13. A method according to claim 8, wherein step (f) includes the step of:

(f-1)assembling selected types of spectrum information which may be used for identification of banknotes.

14. A method according to claim 8, wherein the imaging device comprises a monochrome charge coupled device (CCD) camera.

15. An apparatus for imaging an object, the apparatus comprising:

imaging means for acquiring an image of an object;

a variable interference filter for passing light only of specific wavelengths;

image processing means for processing acquired images and extracting selected data therefrom to produce a filtered spectral image of said object including spectral and spatial distribution of color thereover; and said image processing means being further configured for comparing said spectral image of said object with a reference spectral image for a corresponding genuine object, and wherein said object is a banknote.

16. An apparatus according to claim 15, further comprising media transport means for moving the object relative to the filter and the imaging means.

17. An apparatus according to claim 15, wherein the imaging means comprises a charge coupled device (CCD) camera.

18. An apparatus comprising;

means for acquiring an image of an object;

a variable interference filter for passing light only of specific wavelengths;

means for processing acquired images and extracting selected data therefrom to produce a filtered spectral image of said object including spectral and spatial distribution of color thereover; and said image processing means being further configured for comparing said spectral image of said object with a reference spectral image for a corresponding genuine object, and wherein said object is a banknote.

19. An apparatus according to claim 18, further comprising means for moving the object relative to the filter and the image acquiring means.

20. An apparatus according to claim 18, wherein the image acquiring means comprises a charge coupled device (CCD) camera.

21. An apparatus for authenticating an object by color therein comprising:

a charge coupled device camera;

a variable interference filter having a wavelength range including a visible spectrum of colors varying along a length thereof;

means for transporting said object relative to said filter in optical alignment with said filter and camera in turn;

a computer operatively joined to said camera and transporting means, and configured for producing a filtered spectral image of said object including spectral and spatial distribution of color thereover; and said computer being further configured for comparing said spectral image of said object with a reference spectral image for a corresponding genuine object, and wherein said object is a colored banknote.

22. An apparatus according to claim 21 wherein said computer is further configured for producing said filtered spectral image in a single color distribution over said object, and comparing said single color image with a reference spectral image of the same color.

23. An apparatus according to claim 22 wherein said computer is further configured for producing a plurality of different color spectral images across the full spectrum range of said variable interference filter.

24. An apparatus according to claim 23 wherein said computer is further configured to vary the rate of image acquisition in said camera and the speed of movement of said object in said transporting means to independently vary the spatial and spectral resolution of said filtered spectral images.

25. An apparatus according to claim 24 wherein said camera is a monochrome camera without color filtering except for said variable interference filter.

26. A method of using said apparatus according to claim 21 comprising:

scanning said object with said camera to produce said filtered spectral image thereof; and comparing said scanned image with said reference spectral image to authenticate said object relative to said genuine object.

27. A method according to claim 26 wherein said filtered spectral image of said object is selected to identify a singular pure color ink therein as distinct from a mixture of multiple color inks.

* * * * *

UNITED STATES PATENT AND TRADEMARK OFFICE

CERTIFICATE OF CORRECTION

PATENT NO. : 6,757,419 B1
DATED : June 29, 2004
INVENTOR(S) : Ross, G. A. et al.

It is certified that error appears in the above-identified patent and that said Letters Patent is hereby corrected as shown below:

Column 6,
Line 42, after "an" and insert -- image --.

Signed and Sealed this

Twenty-second Day of March, 2005

JON W. DUDAS
*Director of the United States Patent and Trademark Office*